(12) United States Patent
Ishihara et al.

(10) Patent No.: US 11,320,023 B2
(45) Date of Patent: May 3, 2022

(54) CONTINUOUSLY VARIABLE TRANSMISSION AND TRANSMISSION BELT

(71) Applicant: AISIN CORPORATION, Kariya (JP)

(72) Inventors: Wataru Ishihara, Anjo (JP); Akira Ochi, Anjo (JP); Takayuki Miyake, Okazaki (JP); Junichi Tokunaga, Anjo (JP)

(73) Assignee: AISIN CORPORATION, Kariya (JP)

( * ) Notice: Subject to any disclaimer, the term of this patent is extended or adjusted under 35 U.S.C. 154(b) by 186 days.

(21) Appl. No.: 16/606,277

(22) PCT Filed: May 14, 2018

(86) PCT No.: PCT/JP2018/018594
§ 371 (c)(1),
(2) Date: Oct. 18, 2019

(87) PCT Pub. No.: WO2018/212138
PCT Pub. Date: Nov. 22, 2018

(65) Prior Publication Data
US 2021/0116001 A1    Apr. 22, 2021

(30) Foreign Application Priority Data
May 16, 2017  (JP) .............................. JP2017-097351

(51) Int. Cl.
*F16G 5/16* (2006.01)
*F16H 9/18* (2006.01)
*F16H 57/04* (2010.01)

(52) U.S. Cl.
CPC .............. *F16G 5/163* (2013.01); *F16H 9/18* (2013.01); *F16H 57/043* (2013.01); *F16H 57/0456* (2013.01); *F16H 57/0489* (2013.01)

(58) Field of Classification Search
CPC ........ F16G 5/16; F16G 5/163; F16H 57/0489; F16H 57/0456
(Continued)

(56) References Cited

U.S. PATENT DOCUMENTS 4,525,160 A  *  6/1985  Okawa ...................... F16G 5/16
                                                        474/201
4,552,548 A  *  11/1985  Hattori ...................... F16H 9/24
                                                        474/201
(Continued)

FOREIGN PATENT DOCUMENTS

JP        58-22547 U    2/1983
JP        60-58948 U    4/1985
(Continued)

OTHER PUBLICATIONS

International Search Report for PCT/JP2018/018594 dated Jul. 17, 2018 [PCT/ISA/210].

*Primary Examiner* — Henry Y Liu
(74) *Attorney, Agent, or Firm* — Sughrue Mion, PLLC

(57) ABSTRACT

A continuously variable transmission includes a transmission belt including a plurality of elements each including a pair of pillar portions and a ring arranged between the pair of pillar portions of each of the plurality of elements, and a lubricant supply portion arranged on an inner side of the transmission belt in a radial direction. Each of the plurality of elements further includes a pair of rocking edge portions formed away from each other in a width direction, and a non-contact portion extending between the pair of rocking edge portions in the width direction along a saddle surface. A clearance that communicates the non-contact portion and a region on an inner side in the radial direction with respect to the transmission belt is formed between the elements included in a looped portion of the transmission belt around a first or second pulley.

13 Claims, 6 Drawing Sheets

(58) Field of Classification Search
USPC .................................. 474/8, 91, 244, 242
See application file for complete search history.

(56) References Cited

U.S. PATENT DOCUMENTS

| | | | |
|---|---|---|---|
| 4,758,211 A * | 7/1988 | Hattori | F16G 5/16 474/201 |
| 4,838,845 A * | 6/1989 | Hattori | F16G 5/16 474/201 |
| 4,854,926 A * | 8/1989 | Hattori | F16G 5/16 474/242 |
| 4,891,039 A * | 1/1990 | Hattori | F16G 5/16 474/242 |
| 5,033,989 A * | 7/1991 | Shimaguchi | F16H 57/0457 474/8 |
| 5,123,880 A * | 6/1992 | Sekine | F16H 9/24 474/244 |
| 5,342,251 A * | 8/1994 | Kanehara | G01L 5/102 474/242 |
| 5,346,440 A * | 9/1994 | Smeets | F16G 5/16 474/242 |
| 5,605,513 A * | 2/1997 | Van Der Hardt Aberson | F16H 57/0421 474/43 |
| 5,711,730 A * | 1/1998 | Friedman | F16H 59/14 474/18 |
| 6,186,917 B1 * | 2/2001 | Friedmann | F16H 55/56 474/18 |
| 6,336,878 B1 * | 1/2002 | Ehrlich | F16H 55/56 474/18 |
| 6,379,275 B1 * | 4/2002 | Serkh | F16H 55/54 474/49 |
| 6,409,620 B1 * | 6/2002 | Yoshida | F16G 5/16 474/201 |
| 6,435,994 B1 * | 8/2002 | Friedmann | F16H 7/18 474/111 |
| 6,464,606 B2 * | 10/2002 | Brandsma | F16G 5/16 474/242 |
| 6,506,136 B2 * | 1/2003 | Schmid | F16H 55/56 474/18 |
| 6,537,166 B1 * | 3/2003 | Adriaenssens | B24B 29/04 474/8 |
| 6,626,781 B2 * | 9/2003 | Van Der Kamp | F16H 57/0456 474/91 |
| 6,645,104 B2 * | 11/2003 | Suzuki | B21D 53/14 474/201 |
| 6,672,984 B2 * | 1/2004 | Yagasaki | F16G 5/16 474/201 |
| 6,679,798 B1 * | 1/2004 | Takagi | F16G 5/16 474/242 |
| 6,705,963 B2 * | 3/2004 | Smeets | F16G 5/16 474/201 |
| 7,125,355 B2 * | 10/2006 | Schmidt | F16H 57/0456 474/91 |
| 7,438,659 B2 * | 10/2008 | Kim | F16H 57/0489 474/91 |
| 7,963,873 B2 * | 6/2011 | Kobayashi | F16G 5/16 474/242 |
| 8,337,347 B2 * | 12/2012 | Kobayashi | F16G 5/16 474/201 |
| 8,672,097 B2 * | 3/2014 | Yagasaki | F16H 57/0456 184/15.1 |
| 8,870,695 B2 * | 10/2014 | Nishimi | F16G 5/16 474/242 |
| 9,458,916 B2 * | 10/2016 | Garcia | F16H 7/18 |
| 9,746,056 B2 * | 8/2017 | Sassa | F16H 57/0489 |
| 10,060,514 B2 * | 8/2018 | Nakamura | F16H 57/023 |
| 10,094,446 B2 * | 10/2018 | Yagasaki | F16G 5/16 |
| 10,794,471 B2 * | 10/2020 | Ribbers | F16H 57/0413 |
| 11,047,451 B2 * | 6/2021 | Ochi | F16G 5/16 |
| 2002/0013189 A1 * | 1/2002 | Van Der Kamp | F16H 57/0456 474/91 |
| 2002/0137585 A1 * | 9/2002 | Smeets | F16G 5/163 474/242 |
| 2003/0040387 A1 * | 2/2003 | Kanehara | F16G 5/16 474/242 |
| 2004/0053723 A1 * | 3/2004 | Smeets | F16G 5/163 474/242 |
| 2004/0082416 A1 * | 4/2004 | Schmidt | F16H 57/0489 474/91 |
| 2004/0082417 A1 * | 4/2004 | Smeets | F16G 5/16 474/242 |
| 2004/0142792 A1 * | 7/2004 | Glas | F16H 61/66254 477/70 |
| 2004/0176202 A1 * | 9/2004 | Sakai | F16G 5/16 474/242 |
| 2006/0079361 A1 * | 4/2006 | Ueda | F16G 5/16 474/201 |
| 2007/0072721 A1 * | 3/2007 | Takagi | F16G 5/16 474/242 |
| 2008/0274848 A1 * | 11/2008 | Van Der Leest | F16H 9/24 474/201 |
| 2008/0305906 A1 * | 12/2008 | Kobayashi | F16G 5/16 474/242 |
| 2009/0054189 A1 * | 2/2009 | Tani | F16G 5/16 474/246 |
| 2009/0203478 A1 * | 8/2009 | Kobayashi | F16G 5/16 474/242 |
| 2010/0016112 A1 * | 1/2010 | Kobayashi | B29D 29/10 474/255 |
| 2010/0016113 A1 * | 1/2010 | Kobayashi | F16G 5/16 474/261 |
| 2010/0069184 A1 * | 3/2010 | Baba | F16G 5/16 474/91 |
| 2011/0183792 A1 * | 7/2011 | Yagasaki | F16H 57/0456 474/43 |
| 2011/0237376 A1 * | 9/2011 | Sano | F16G 5/16 474/242 |
| 2011/0300980 A1 * | 12/2011 | Kuwabara | F16G 5/16 474/242 |
| 2012/0231910 A1 * | 9/2012 | Nishimi | F16G 5/16 474/148 |
| 2013/0040772 A1 * | 2/2013 | Ando | F16G 5/16 474/265 |
| 2015/0080157 A1 * | 3/2015 | Sumida | F16H 9/18 474/28 |
| 2015/0080158 A1 * | 3/2015 | Van Der Heijde | F16H 9/18 474/43 |
| 2015/0361516 A1 * | 12/2015 | Inagaki | C21D 9/0068 474/166 |
| 2016/0053852 A1 * | 2/2016 | Yagasaki | F16G 5/16 474/272 |
| 2016/0102732 A1 * | 4/2016 | Yagasaki | F16G 5/16 474/242 |

FOREIGN PATENT DOCUMENTS

| | | |
|---|---|---|
| JP | 3-089050 A | 4/1991 |
| JP | 2006-112485 A | 4/2006 |
| JP | 2006-153089 A | 6/2006 |
| JP | 2018-048716 A | 3/2018 |
| WO | 00/28237 A1 | 5/2000 |

* cited by examiner

CONTINUOUSLY VARIABLE TRANSMISSION AND TRANSMISSION BELT

CROSS REFERENCE TO RELATED APPLICATIONS

This application is a National Stage of International Application No. PCT/JP2018/018594, filed on May 14, 2018, which claims priority from Japanese Patent Application No. 2017-097351, filed on May 16, 2017.

TECHNICAL FIELD

The present disclosure relates to a continuously variable transmission including a transmission belt having a plurality of elements and a ring that binds the plurality of elements into an annular shape, and relates to the transmission belt.

BACKGROUND ART

Hitherto, there is known a transmission belt element having a laterally extending body portion and a pair of pillar portions extending upward from right and left ends of an upper part of the body portion, respectively (see, for example, Patent Document 1). An inclined surface is formed on the front main surface of the element so as to be located below a laterally extending rocking edge portion. The thickness of the element decreases toward the lower end. A vertically extending recess is formed substantially at the center of the front main surface or the rear main surface of the element in a lateral direction. Thus, in a transmission belt including this element, misalignment is smoothed out and yawing is suppressed by bringing adjacent elements into contact with each other on both sides of the recess.

RELATED ART DOCUMENTS

Patent Documents

Patent Document 1: Japanese Patent Application Publication No. 2006-153089 (JP 2006-153089 A)

SUMMARY OF THE INVENTION

While the transmission belt described above is transferring a torque between a pair of pulleys, a circumferential speed difference occurs between a saddle surface of the element and a ring when the transmission belt is looped around the pulley, thereby causing friction between the saddle surface and the ring. Thus, it is necessary to reduce the friction caused between the saddle surface and the ring in order to improve the durability and the power transfer efficiency of the transmission belt. However, Patent Document 1 does not describe any specific measures to reduce the friction between the saddle surface of the element and the ring.

In view of the above, the invention disclosed herein has a main object to improve the durability and the power transfer efficiency of the transmission belt by reducing the friction caused between the saddle surface of the element and the ring.

A continuously variable transmission disclosed herein is a continuously variable transmission including a first pulley on a driving side, a second pulley on a driven side, and a transmission belt looped around V-shaped grooves of the first and second pulleys and including a plurality of elements each including a body portion having a saddle surface and a pair of pillar portions extending from the body portion so as to be located on both sides of the saddle surface in a width direction, and a ring arranged between the pair of pillar portions of each of the plurality of elements such that the ring is in contact with the saddle surface. The continuously variable transmission includes a lubricant supply portion arranged on an inner side of the transmission belt in a radial direction and configured to supply a lubricant to the transmission belt. Each of the plurality of elements further includes a pair of rocking edge portions formed away from each other in the width direction, and a non-contact portion that is a recess formed on one surface of the body portion so as to extend between the pair of rocking edge portions in the width direction along the saddle surface. A clearance that communicates the non-contact portion and a region on an inner side in the radial direction with respect to the transmission belt is formed between the elements included in a looped portion of the transmission belt around the first pulley or the second pulley.

Each of the plurality of elements included in the transmission belt of this continuously variable transmission includes the pair of rocking edge portions formed away from each other in the width direction, and the non-contact portion that is the recess formed on the one surface of the body portion so as to extend between the pair of rocking edge portions in the width direction along the saddle surface. Therefore, the contact between the adjacent elements at a portion other than the rocking edge portion is suppressed. Thus, the durability of each element can further be improved. In this continuously variable transmission, the lubricant supply portion configured to supply the lubricant to the transmission belt is arranged on the inner side of the transmission belt in the radial direction, and the clearance that communicates the non-contact portion and the region on the inner side in the radial direction with respect to the transmission belt is formed between the elements included in the looped portion of the transmission belt around the first or second pulley. Therefore, the lubricant can be supplied from the lubricant supply portion to the non-contact portion of each element included in the looped portion. Thus, the lubricant can be supplied to the space between the saddle surface of the element and the ring by using the non-contact portion as a lubricant passage. As a result, it is possible to reduce the friction caused between the ring and the saddle surface of the element included in the looped portion of the transmission belt around the first or second pulley, and therefore further improve the durability and the power transfer efficiency of the transmission belt.

SUMMARY OF THE DISCLOSURE

Modes for carrying out the various aspects of the disclosure are described with reference to the drawings.

Figure 1:
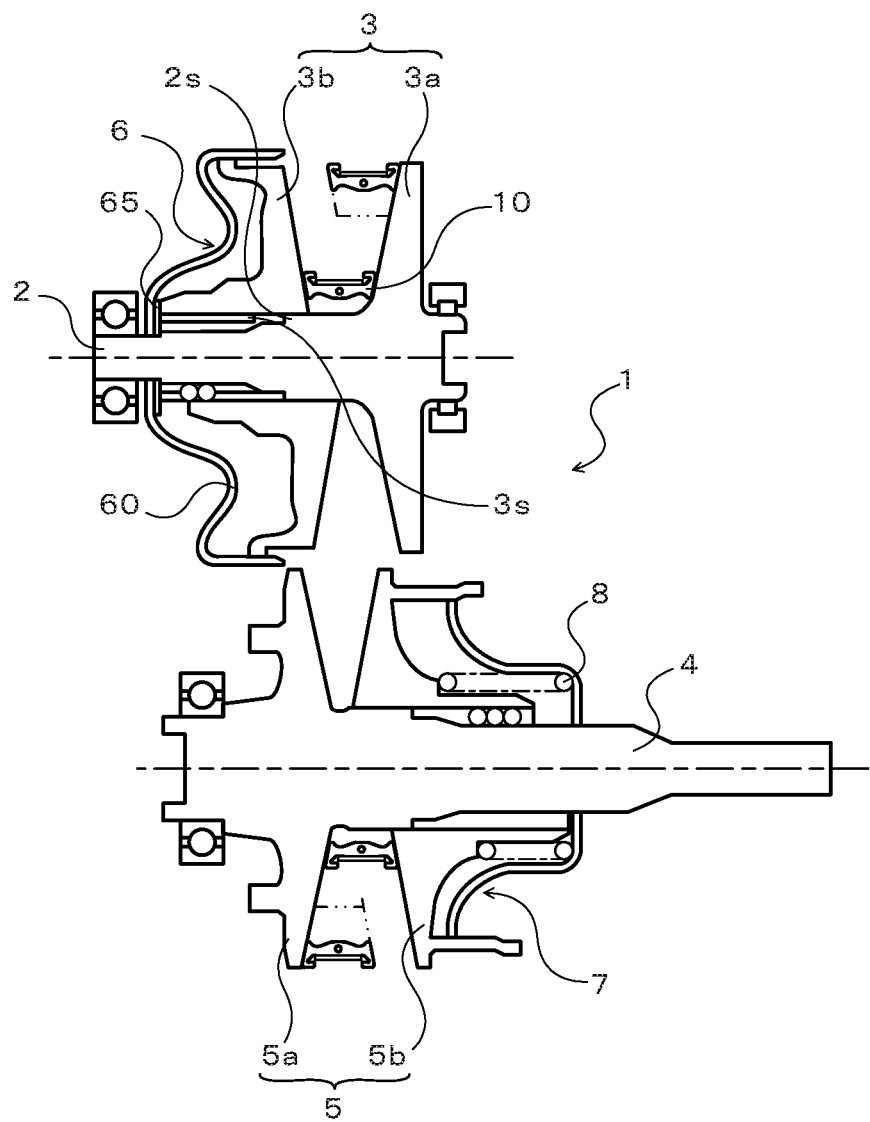
FIG. 1 is a schematic structural view illustrating an example of a continuously variable transmission disclosed herein.

FIG. 1 is a schematic structural view illustrating a continuously variable transmission (CVT) 1 disclosed herein. The continuously variable transmission 1 illustrated in FIG. 1 is mounted on a vehicle, and includes a primary shaft (first shaft) 2 serving as a driving rotary shaft, a primary pulley (first pulley) 3 provided on the primary shaft 2, a secondary shaft (first shaft) 4 serving as a driven rotary shaft arranged in parallel to the primary shaft 2, a secondary pulley (second pulley) 5 provided on the secondary shaft 4, and a transmission belt 10. As illustrated in FIG. 1, the transmission belt 10 is looped around a pulley groove (V-shaped groove) of the primary pulley 3 and a pulley groove (V-shaped groove) of the secondary pulley 5.

The primary shaft 2 is coupled, via an unillustrated forward/reverse switching mechanism, to an input shaft (not illustrated) coupled to a power source such as an engine (internal combustion engine) of a vehicle. The primary pulley 3 includes a fixed sheave 3a formed integrally with the primary shaft 2, and a movable sheave 3b supported by the primary shaft 2 via a ball spline or the like so as to be slidable in an axial direction. The secondary pulley 5 includes a fixed sheave 5a formed integrally with the secondary shaft 4, and a movable sheave 5b supported by the secondary shaft 4 via a ball spline or the like so as to be slidable in the axial direction and urged in the axial direction by a return spring 8.

The continuously variable transmission 1 further includes a primary cylinder 6 that is a hydraulic actuator configured to change the groove width of the primary pulley 3, and a secondary cylinder 7 that is a hydraulic actuator configured to change the groove width of the secondary pulley 5. The primary cylinder 6 is formed behind the movable sheave 3b of the primary pulley 3. The secondary cylinder 7 is formed behind the movable sheave 5b of the secondary pulley 5. Hydraulic oil is supplied from an unillustrated hydraulic controller to the primary cylinder 6 and the secondary cylinder 7 in order to change the groove widths of the primary pulley 3 and the secondary pulley 5.

That is, when the vehicle on which the continuously variable transmission 1 is mounted travels, a hydraulic pressure based on a target speed ratio of the continuously variable transmission 1 that is determined from an accelerator operation amount (throttle opening), a vehicle speed, and an engine speed of the vehicle is supplied from the unillustrated hydraulic controller to the primary cylinder 6. A hydraulic pressure regulated so that a slip of the transmission belt 10 is suppressed is supplied from the hydraulic controller to the secondary cylinder 7. This makes it possible to continuously vary a torque transferred from the engine (power source) of the vehicle to the primary shaft 2 via the input shaft and the forward/reverse switching mechanism and to output the resultant torque to the secondary shaft 4. The torque transferred to the secondary shaft 4 is output to driving wheels (neither of which is illustrated) of the vehicle via a gear mechanism, a differential gear, and drive shafts.

As illustrated in FIG. 1, a step portion is formed at the end of the primary shaft 2 that is opposite to the engine (left end in FIG. 1). An annular end plate 65 is interposed between the step portion and a primary piston 60 of the primary cylinder 6 so as to be abuttable against the end of the movable sheave 3b of the primary pulley 3 that is opposite to the engine (left end in FIG. 1). A stopper portion 2s is formed on the primary shaft 2 so as to be abuttable against the ends of spline teeth 3s on the fixed sheave 3a side. The spline teeth 3s are formed on the inner peripheral surface of the movable sheave 3b.

Figure 2:
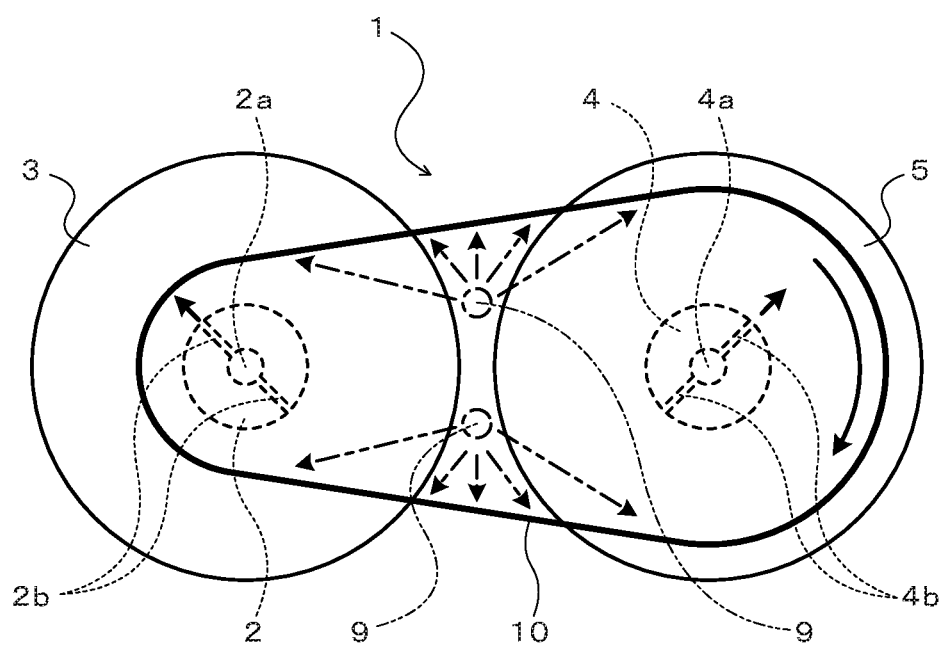
FIG. 2 is a schematic structural view illustrating the example of the continuously variable transmission disclosed herein.

As indicated by dashed lines in FIG. 2, the primary shaft 2 has a first oil hole 2a formed at the center of the primary shaft 2 so as to extend in the axial direction, and second oil holes 2b that communicate with the first oil hole 2a and extend in a radial direction to be open at the outer peripheral surface of the primary shaft 2. The secondary shaft 4 has a first oil hole 4a formed at the center of the secondary shaft 4 so as to extend in the axial direction, and second oil holes 4b that communicate with the first oil hole 4a and extend in a radial direction to be open at the outer peripheral surface of the secondary shaft 4. Hydraulic oil is supplied from a hydraulic controller (oil pump) to the first oil holes 2a and 4a. When the primary shaft 2 and the secondary shaft 4 rotate, the hydraulic oil serving as a lubricating coolant can be ejected from the second oil holes 2b and 4b toward the inner peripheral surface of the transmission belt 10.

Figure 3:
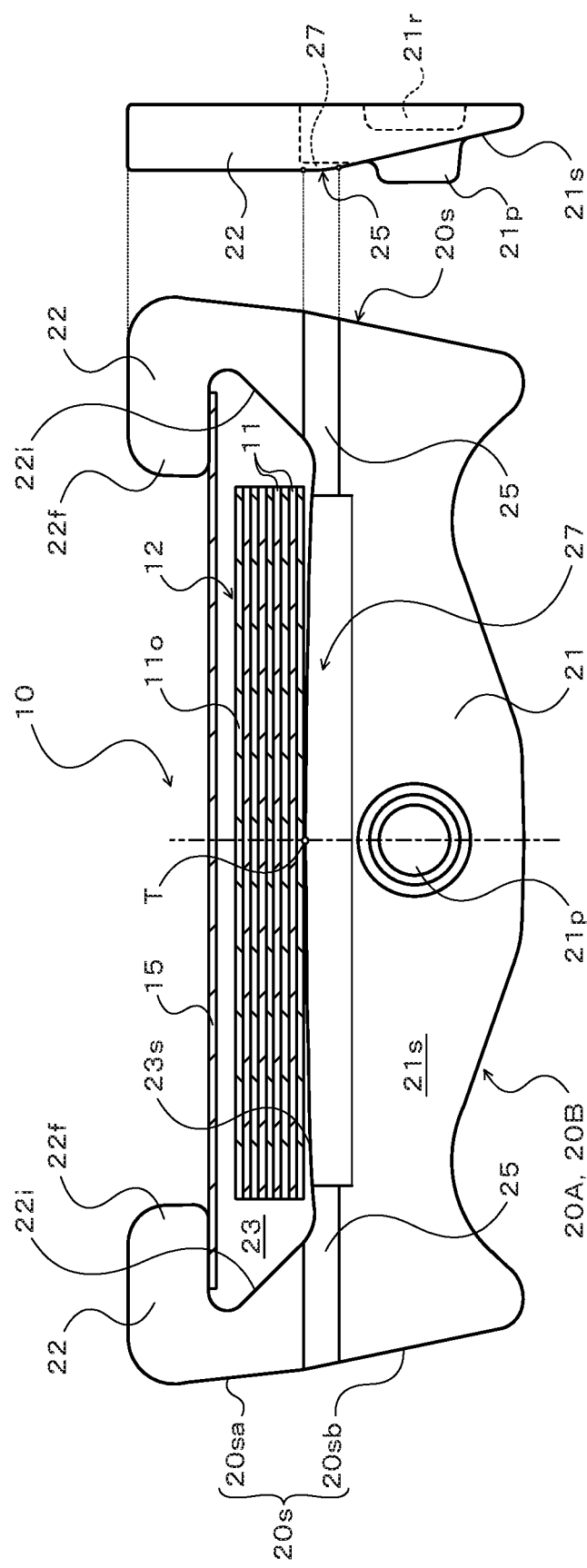
FIG. 3 is a schematic structural view illustrating an element of a transmission belt included in the continuously variable transmission disclosed herein.

FIG. 3 is a local sectional view illustrating the transmission belt 10. As illustrated in FIG. 3, the transmission belt 10 includes one stacked ring 12 structured by stacking a plurality of (for example, nine in this embodiment) elastically deformable ring members 11 in a thickness direction (ring radial direction), one retainer ring 15, and a plurality of (for example, a total of several hundred) first and second elements 20A and 20B arrayed (bound) into an annular shape along the inner peripheral surface of the stacked ring 12. In this embodiment, the second element 20B has a thickness (maximum thickness) slightly (for example, by about 0.1 mm) larger than that of the first element 20A, and a plurality of the first elements 20A are arrayed side by side and a plurality of the second elements 20B are arrayed side by side. Thus, the occurrence of vibration or noise can be reduced when the transmission belt 10 transfers the torque between the primary pulley 3 and the secondary pulley 5.

The plurality of ring members 11 that structure the stacked ring 12 are elastically deformable members cut out from a drum made of a steel sheet, and are processed so as to have approximately equal thicknesses and different circumferential lengths determined in advance. For example, the retainer ring 15 is an elastically deformable ring cut out from a drum made of a steel sheet, and has a thickness approximately equal to or smaller than that of the ring member 11. The retainer ring 15 has an inner circumferential length larger than the outer circumferential length of an outermost ring member 11o of the stacked ring 12. Thus, as illustrated in FIG. 3, an annular clearance is formed between the outer peripheral surface of the outermost ring member 11o and the inner peripheral surface of the retainer ring 15 in a state in which the stacked ring 12 and the retainer ring 15 are arranged concentrically (no-load state in which no tensile force is applied).

For example, each of the first and second elements 20A and 20B is stamped out from a steel sheet by pressing, and includes, as illustrated in FIG. 3, a body portion 21 extending horizontally in FIG. 3, a pair of pillar portions 22 extending in the same direction from both ends of the body portion 21, a single ring housing portion (recess) 23 defined between the pair of pillar portions 22 so as to be open on a free end side of the pillar portions 22, and a pair of side surfaces 20s formed so that the distance therebetween increases with increasing proximity to an outer peripheral side of the stacked ring 12 (outer side in the radial direction of the stacked ring 12) from an inner peripheral side of the stacked ring 12.

The pair of pillar portions 22 extend outward in the radial direction of the stacked ring 12 (direction from the inner peripheral side to the outer peripheral side of the transmission belt 10 (stacked ring 12), that is, upward in FIG. 3) from both sides of a saddle surface 23s in a width direction. The saddle surface 23s is the bottom surface of the ring housing portion 23. Hook portions 22f protruding in the width direction of the saddle surface 23s are formed at the free ends of the pillar portions 22. The pair of hook portions 22f face each other at a distance that is slightly larger than the width of the stacked ring 12 (ring members 11) and is smaller than the width of the retainer ring 15. The pillar portion 22 of each of the first and second elements 20A and 20B has a flat inner surface 22i inclined away from the saddle surface 23s toward the outer side in the radial direction of the stacked ring 12. A concave surface (for example, a concave columnar surface) smoothly continuous with the saddle surface 23s and the inner surface 22i of the pillar portion 22 is formed between the saddle surface 23s and the inner surface 22i.

As illustrated in FIG. 3, the stacked ring 12 is arranged in the ring housing portion 23, and the saddle surface 23s of the ring housing portion 23 is in contact with the inner peripheral surface of the stacked ring 12, that is, the innermost ring member 11. The saddle surface 23s has a bilaterally symmetrical convex shape (crowning shape) in which the saddle surface 23s is gently inclined downward in FIG. 3 with increasing proximity to the outer side in the width direction from a top portion T defined at the center in the width direction. Thus, the stacked ring 12 can be centered by applying, to the stacked ring 12, a centripetal force directed to the top portion T through friction with the saddle surface 23s. The saddle surface 23s may include a plurality of convex surfaces curved outward in the radial direction of the stacked ring 12.

The elastically deformed retainer ring 15 is fitted into the ring housing portion 23 via a space between the pair of hook portions 22f of each of the first and second elements 20A and 20B. The retainer ring 15 surrounds the stacked ring 12 while being arranged between the outer peripheral surface of the outermost ring member 11o of the stacked ring 12 and the hook portions 22f of each of the first and second elements 20A and 20B, thereby restricting, in cooperation with the pair of pillar portions 22, the occurrence of a case where each of the first and second elements 20A and 20B detaches from the stacked ring 12 or a case where the stacked ring 12 detaches from each of the first and second elements 20A and 20B. Thus, the plurality of first and second elements 20A and 20B are bound (arrayed) into an annular shape along the inner peripheral surface of the stacked ring 12. In this embodiment, one or a plurality of unillustrated openings (elongated holes) are formed in the retainer ring 15. Accordingly, the retainer ring 15 is elastically deformed with ease, and the easiness of mounting of the retainer ring 15 on each of the first and second elements 20A and 20B can be secured.

Each side surface 20s of each of the first and second elements 20A and 20B includes a first side surface 20sa located on the pillar portion 22 side, that is, on a side (outer side) opposite to the inner surface 22i of the pillar portion 22, and a second side surface 20sb formed continuous with the first side surface 20sa and located on an inner side in the radial direction of the stacked ring 12 with respect to the first side surface 20sa. In this embodiment, the pair of first side surfaces 20sa are formed so that the distance therebetween increases with increasing proximity to the outer side in the radial direction of the stacked ring 12 similarly to the second side surfaces 20sb. Thus, the strength of each pillar portion 22 can be secured satisfactorily.

An angle formed between the pair of second side surfaces 20sb is set approximately equal to opening angles of the pulley grooves of the primary pulley 3 and the secondary pulley 5 (in this embodiment, slightly larger than design values of the opening angles). An angle formed between the pair of first side surfaces 20sa is set smaller than the angle formed between the pair of second side surfaces 20sb. Thus, the second side surfaces 20sb of each of the first and second elements 20A and 20B serve as torque transfer surfaces (flank surfaces) configured to transfer the torque from the primary pulley 3 to the secondary pulley 5 with a friction force by receiving a compression force from the pulley 3 or 5 while being brought into frictional contact with the surfaces of the pulley groove of the primary pulley 3 or the pulley groove of the secondary pulley 5. The pair of first side surfaces 20sa are not basically in contact with the surfaces of the pulley groove when the transmission belt 10 transfers the torque from the primary pulley 3 to the secondary pulley 5. Unillustrated projections and recesses (plurality of grooves) for retaining hydraulic oil to be used for lubricating and cooling a contact portion between each of the first and second elements 20A and 20B and the primary pulley 3 or the secondary pulley 5 are formed on the surface of each second side surface 20sb.

As illustrated in FIG. 3, a pair of rocking edge portions (contact regions) 25, a non-contact portion 27, a tapered surface (inclined surface) 21s, and one protrusion (dimple) 21p are formed on the front surface (one surface) of each of the first and second elements 20A and 20B. The pair of rocking edge portions 25 are formed on the front surface of each of the first and second elements 20A and 20B to bridge the respective pillar portions 22 and the body portion 21 while being spaced away from each other in the width direction of the saddle surface 23s. The non-contact portion 27 is formed between the pair of rocking edge portions 25 in the width direction. In this embodiment, the edge of the non-contact portion 27 on a belt inner peripheral side (lower edge in FIG. 3) is located on the belt inner peripheral side (lower side in FIG. 3) with respect to the edge of each rocking edge portion 25 on the belt inner peripheral side (lower edge in FIG. 3). The tapered surface 21s is formed on the front surface (one surface) of the body portion 21 so as to extend from the non-contact portion 27 and the pair of rocking edge portions 25 in a direction opposite to the protruding direction of each pillar portion 22, that is, toward the belt inner peripheral side (lower side in FIG. 3). The protrusion 21p protrudes from the tapered surface 21s at the center of the front surface of the body portion 21 in the width direction.

Figure 4:
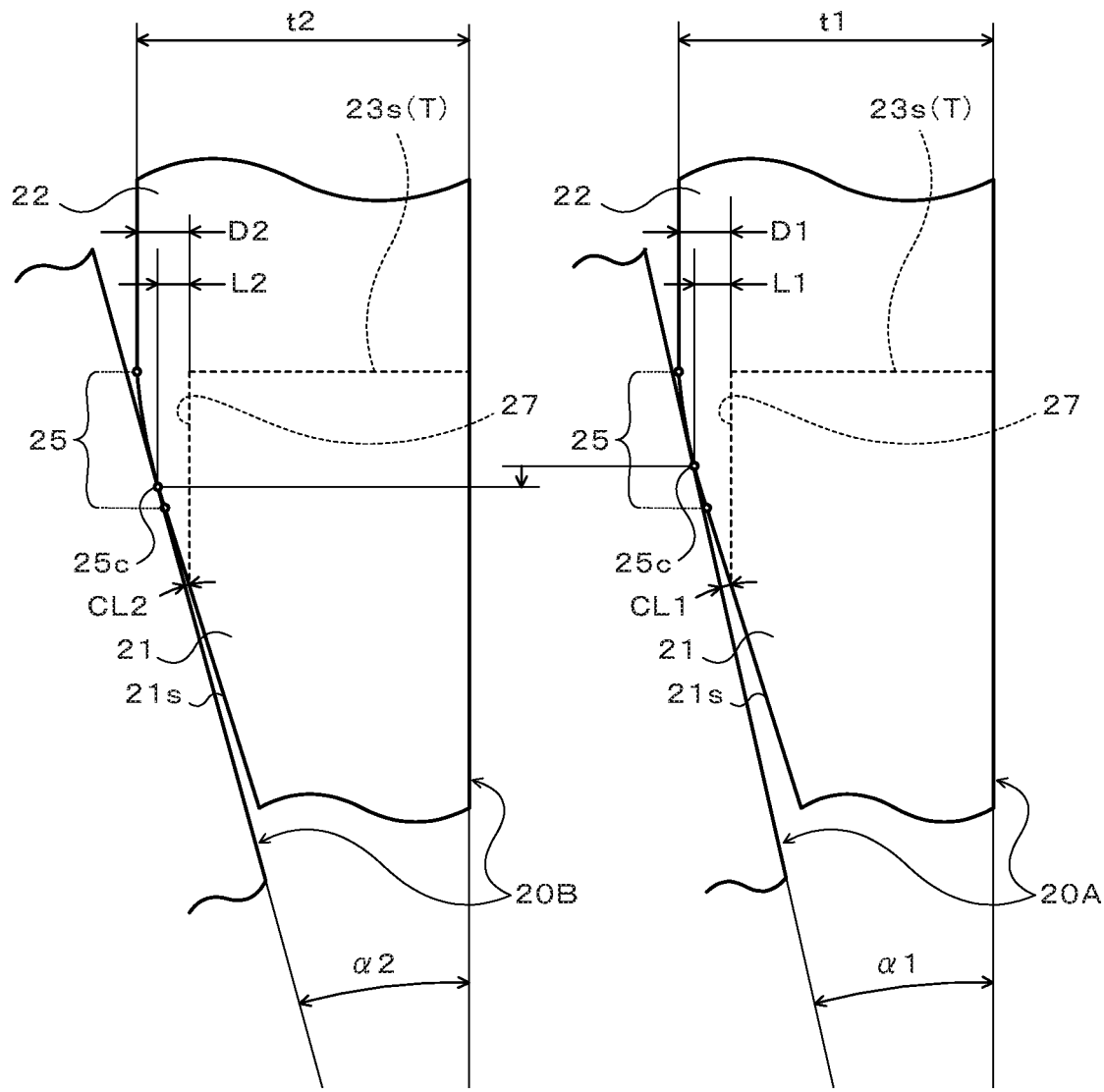
FIG. 4 is a schematic structural view illustrating the element of the transmission belt included in the continuously variable transmission disclosed herein.

As illustrated in FIG. 3, the front surface of each of the first and second elements 20A and 20B (mainly the front surfaces of the pillar portions 22) located on a belt outer peripheral side with respect to the rocking edge portions 25 and the non-contact portion 27 and the rear surface (other surface) of each of the first and second elements 20A and 20B are formed as flat surfaces. Thus, as illustrated in FIG. 4, the pillar portion 22 of each of the first and second elements 20A and 20B has a constant thickness (maximum thickness) t1 or t2 (t2>0). As illustrated in FIG. 3, the tapered surface 21s located on the belt inner peripheral side (lower side in FIG. 3) with respect to the rocking edge portions 25 and the non-contact portion 27 is closer to the rear surface (back surface) with increasing distance from the pillar portions 22 (toward the belt inner peripheral side). In this embodiment, the inclination angles of the tapered surfaces 21s of the first element 20A and the second element 20B are set equal to each other. A dent 21r is formed on the rear surface of each of the first and second elements 20A and 20B (body portion 21) so as to be located on a back side of the protrusion 21p. When the transmission belt 10 is assembled, the protrusion 21p of the adjacent first or second element 20A or 20B is loosely fitted to the dent 21r.

Each rocking edge portion 25 is a short band-shaped convex surface. In this embodiment, the rocking edge portion 25 is a columnar surface (curved surface) having a predetermined curvature radius. Each rocking edge portion 25 includes a contact line 25c (see FIG. 4) where the adjacent first or second elements 20A or 20B are in contact with each other to serve as a fulcrum of turn of the first or second elements 20A or 20B. The position of the contact line 25c varies within a range of the rocking edge portion 25 depending on a speed ratio γ of the continuously variable transmission 1.

The non-contact portion 27 is a band-shaped recess formed on the front surface (one surface) of the body portion 21 so as to be open at the saddle surface 23s and extend in the width direction along the saddle surface 23s to separate the pair of rocking edge portions 25. The bottom surface of the non-contact portion 27 is a flat surface parallel to the front surface (mainly the front surfaces of the pillar portions 22) and the rear surface of each of the first and second elements 20A and 20B, and recedes toward the rear surface from the surface of each rocking edge portion 25. Thus, the thickness of the saddle surface 23s is smaller than the thicknesses t1 and t2 of the pillar portions 22. Corners of the non-contact portion 27 (recess) and edges of the body portion 21 that define the non-contact portion 27 are rounded by chamfering or the like.

By forming the non-contact portion 27 in each of the first and second elements 20A and 20B, contact between the adjacent first or second elements 20A or 20B at a portion other than the rocking edge portion 25 can satisfactorily be suppressed in the transmission belt 10. As a result, it is possible to reduce the occurrence of a case where a load from the center of the first or second element 20A or 20B in the width direction, at which a great moment is applied, is applied to the adjacent first or second element 20A or 20B and the first or second element 20A or 20B is deformed. Thus, the durability of each of the first and second elements 20A and 20B can further be improved.

In the continuously variable transmission 1 of this embodiment, specifications of each of the first and second elements 20A and 20B, particularly including the depth of the non-contact portion 27, are set in consideration of the inclination angle of the tapered surface 21s or the like so that a clearance CL1 or CL2 that communicates the non-contact portion 27 and a region on an inner side in the radial direction with respect to the transmission belt 10 is formed between the first elements 20A or the second elements 20B included in a looped portion of the transmission belt 10 around the primary pulley 3 or the secondary pulley 5. Therefore, the hydraulic oil can be supplied to the non-contact portion 27 of each of the first and second elements 20A and 20B included in the looped portion from the second oil holes 2b or 4b of the primary shaft 2 or the secondary shaft 4 serving as a lubricant supply portion. Thus, the hydraulic oil serving as the lubricating coolant can be supplied to a space between the saddle surface 23s of each of the first and second elements 20A and 20B and the stacked ring 12 by using the non-contact portion 27 as a hydraulic oil passage. As a result, it is possible to reduce friction caused between the stacked ring 12 and the saddle surface 23s of each of the first and second elements 20A and 20B included in the looped portion and located on the pulley groove of the primary pulley 3 or the secondary pulley 5, and therefore further improve the durability and the power transfer efficiency of the transmission belt 10.

If looping radii in the primary pulley 3 or the secondary pulley 5 are equal to each other for the transmission belt 10 including the first and second elements 20A and 20B having different thicknesses, as illustrated in FIG. 4, an angle α2 formed between the adjacent second elements 20B included in the looped portion of the transmission belt 10 around the primary pulley 3 or the like is larger than an angle α1 formed between the adjacent first elements 20A included in the looped portion. As the looping radius of the transmission belt 10 in the primary pulley 3 or the secondary pulley 5 decreases, the angle α2 formed between the adjacent second elements 20B included in the looped portion of the transmission belt 10 around the primary pulley 3 or the like increases. As illustrated in FIG. 4, as the angle α2 increases, the contact line 25c between the second elements 20B moves toward the inner peripheral side, and a distance L2 between the contact line 25c and the bottom surface of the non-contact portion 27 is smaller than a distance L1 between the bottom surface of the non-contact portion 27 and the contact line 25c between the first elements 20A. Therefore, if the depth of the non-contact portion 27 is extremely small in the second element 20B having a large thickness, there is a possibility that the clearance CL2 that communicates the non-contact portion 27 and the region on the inner side in the radial direction with respect to the transmission belt 10 is not secured depending on the looping radius of the transmission belt 10 in the primary pulley 3 or the secondary pulley 5.

In view of the above, in this embodiment, a depth D2 of the non-contact portion 27 of the second element 20B (distance between the front surface of the pillar portion 22 and the bottom surface of the non-contact portion 27) is set so that the clearance CL2 is secured between the second elements 20B included in the looped portion of the transmission belt 10 around the primary pulley 3 when the groove width of the primary pulley 3 is maximum and the looping radius of the transmission belt 10 in the primary pulley 3 is minimum, and so that the clearance CL2 is secured between the second elements 20B included in the looped portion of the transmission belt 10 around the secondary pulley 5 when the groove width of the secondary pulley 5 is maximum and the looping radius of the transmission belt 10 in the secondary pulley 5 is minimum. That is, in the continuously variable transmission 1, the clearance CL2 is secured between the second elements 20B included in the looped portion of the transmission belt 10 around the primary pulley 3 when the width of the pulley groove of the primary pulley 3 is maximum and the speed ratio γ is maximum such that the end of the movable sheave 3b abuts against the end plate 65. Further, the clearance CL2 is secured between the second elements 20B included in the looped portion of the transmission belt 10 around the secondary pulley 5 when the width of the pulley groove of the primary pulley 3 is minimum such that the ends of the spline teeth 3s of the movable sheave 3b abut against the stopper portion 2s of the primary shaft 2 and accordingly the width of the pulley groove of the secondary pulley 5 is maximum and the speed ratio γ is minimum owing to the transmission belt 10. In this embodiment, a depth D1 of the non-contact portion 27 of the first element 20A is set equal to the depth D2 of the non-contact portion 27 of the second element 20B.

Thus, the clearance CL1 or CL2 that communicates the non-contact portion 27 and the region on the inner side in the radial direction with respect to the transmission belt 10 can constantly be secured between the first elements 20A or the second elements 20B included in the looped portion of the transmission belt 10 around the primary pulley 3 or the secondary pulley 5. As a result, even if the looping radius of the transmission belt 10 in the primary pulley 3 or the secondary pulley 5 is changed in a driven state, the hydraulic oil can constantly be supplied to the non-contact portion 27 of each of the first and second elements 20A and 20B included in the looped portion from the second oil holes 2b or 4b via the clearance CL1 or CL2. By setting equal depths for the non-contact portions 27 of the first element 20A and the second element 20B, the same forming equipment can be used for forming the non-contact portions 27 in the first and second elements 20A and 20B having different thicknesses. Thus, it is possible to suppress an increase in manufacturing costs of the first and second elements 20A and 20B.

In the continuously variable transmission 1, the first and second oil holes 2a, 2b, 4a, and 4b each serving as the lubricant supply portion are formed in the primary shaft 2 and the secondary shaft 4. Therefore, the hydraulic oil can satisfactorily be supplied to the non-contact portion 27 of each of the first and second elements 20A and 20B included in the looped portion of the transmission belt 10 around the primary pulley 3 or the like via the clearance CL1 or CL2. As indicated by long dashed double-short dashed lines in FIG. 2, the continuously variable transmission 1 may be provided with one or a plurality of nozzles 9 to which the hydraulic oil is supplied from the hydraulic controller (oil pump). In this case, as illustrated in FIG. 2, the plurality of nozzles 9 may be arranged, on the inner side of the transmission belt 10, between the primary pulley 3 and the secondary pulley 5 while being spaced away from each other in a vertical direction. By using the nozzles 9, the hydraulic oil can be ejected from the nozzles 9 toward a portion of the transmission belt 10 to be looped around the primary pulley 3 or the secondary pulley 5 and toward the looped portion of the transmission belt 10 around the primary pulley 3 or the like.

Figure 5:
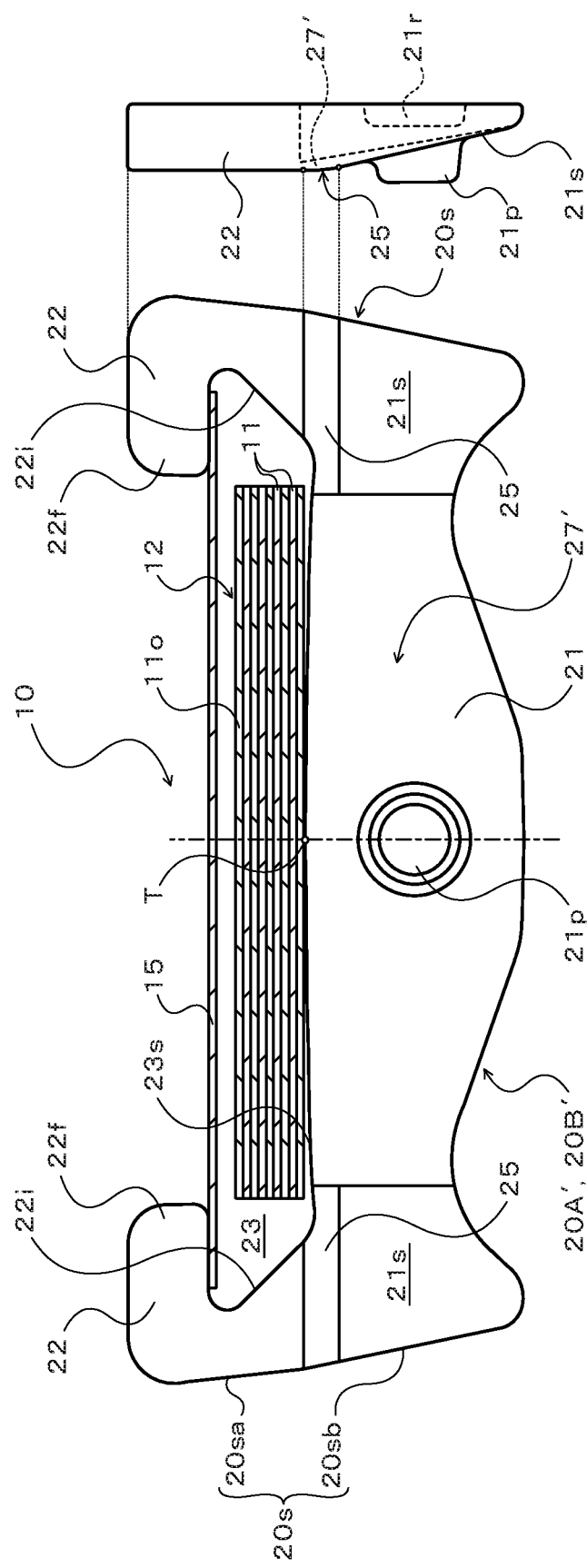
FIG. 5 is a schematic structural view illustrating a modification of the element of the transmission belt included in the continuously variable transmission disclosed herein.

In the embodiment described above, the edge of the non-contact portion 27 on the belt inner peripheral side (lower edge in FIG. 3) in each of the first and second elements 20A and 20B is located above the protrusion 21p, but the edge is not limited to that in this case. The position of the edge of the non-contact portion 27 on the belt inner peripheral side may be set arbitrarily. For example, in each of first and second elements 20A' and 20B' illustrated in FIG. 5, a non-contact portion 27' is formed so as to be open at the saddle surface 23s and extend to the edge of the first or second element 20A' or 20B' on the inner peripheral side. Thus, the clearance CL1 or CL2 that communicates the non-contact portion 27' and the region on the inner side in the radial direction with respect to the transmission belt 10 can be formed more easily between the first elements 20A' or the second elements 20B' included in the looped portion of the transmission belt 10 around the primary pulley 3 or the secondary pulley 5.

Figure 6:
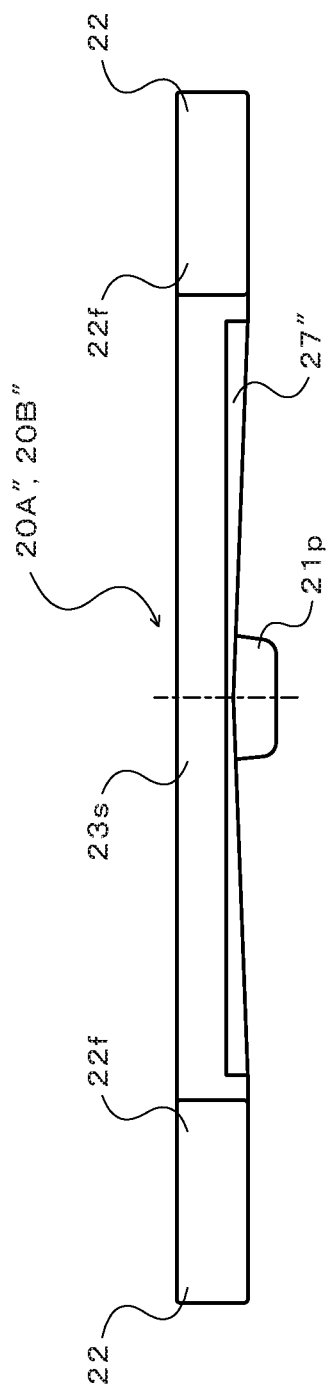
FIG. 6 is a schematic structural view illustrating a modification of the element of the transmission belt included in the continuously variable transmission disclosed herein.

In the embodiment described above, the non-contact portion 27 of each of the first and second elements 20A and 20B is formed so as to have the flat bottom surface, but the non-contact portion 27 is not limited to that in this case. That is, in each of first and second elements 20A" and 20B" illustrated in FIG. 6, a non-contact portion 27" is formed so that the center in the width direction is deeper than both ends in the width direction. Thus, more hydraulic oil (lubricating coolant) can be supplied to a portion between the saddle surface 23s and the stacked ring 12 where a contact pressure is higher. In this case, the depth of the non-contact portion 27" may be set based on the shallowest portion of the non-contact portion 27", or based on the deepest portion of the non-contact portion 27".

In the embodiment described above, the depth D1 of the non-contact portion 27 of the first element 20A is set equal to the depth D2 of the non-contact portion 27 of the second element 20B. The depth D1 of the non-contact portion 27 of the first element 20A may differ from the depth D2 of the non-contact portion 27 of the second element 20B as long as the depth D2 of the non-contact portion 27 of the second element 20B is set as described above. That is, the depth D1 of the non-contact portion 27 of the first element 20A may be set so that the clearance CL1 is secured between the first elements 20A included in the looped portion of the transmission belt 10 around the primary pulley 3 when the groove width of the primary pulley 3 is maximum and the looping radius of the transmission belt 10 in the primary pulley 3 is minimum, and so that the clearance CL1 is secured between the first elements 20A included in the looped portion of the transmission belt 10 around the secondary pulley 5 when the groove width of the secondary pulley 5 is maximum and the looping radius of the transmission belt 10 in the secondary pulley 5 is minimum.

Thus, the depth D1 of the non-contact portion 27 of the first element 20A is smaller than the depth D2 of the non-contact portion 27 of the second element 20B. That is, the depth D2 of the non-contact portion 27 of the second element 20B may be larger than the depth D1 of the non-contact portion 27 of the first element 20A by independently setting the depths D1 and D2 of the non-contact portions 27 of the first element 20A and the second element 20B. Even if this structure is employed, the hydraulic oil can constantly be supplied to the non-contact portion 27 of each of the first and second elements 20A and 20B included in the looped portion of the transmission belt 10 around the primary pulley 3 or the secondary pulley 5 from the second oil holes 2b or 4b via the clearance CL1 or CL2. By setting the small depth D1 for the contacted portion 27 of the first element 20A, the strength of the first element 20A having a small thickness can be secured more satisfactorily.

In the embodiment described above, the first and second elements 20A and 20B having different thicknesses are used as the elements of the transmission belt 10, but the elements are not limited to those elements. That is, the thickness of the first element 20A may be equal to the thickness of the second element 20B. In the continuously variable transmission 1, the width of the pulley groove of the primary pulley 3 is maximum when the speed ratio γ is maximum, but the width of the pulley groove of the primary pulley 3 may be maximum when the speed ratio γ of the continuously variable transmission 1 is not maximum. In the continuously variable transmission 1, the width of the pulley groove of the secondary pulley 5 is maximum when the speed ratio γ is minimum, but the width of the pulley groove of the secondary pulley 5 may be maximum when the speed ratio γ of the continuously variable transmission 1 is not minimum. In those cases, the continuously variable transmission 1 may be structured such that the primary shaft 2 or the secondary shaft 4 is selectively coupled to the input shaft and the primary shaft 2 or the secondary shaft 4 is selectively coupled to the drive shafts of the vehicle. In the transmission belt 10 of the continuously variable transmission 1, the pair of hook portions 22f are provided in each element 20, and the retainer ring 15 is arranged between the stacked ring 12 and the hook portions 22f of each of the plurality of elements 20. The transmission belt 10 is not limited to that in this case. That is, the hook portions 22f may be omitted from each element 20 of the transmission belt 10, or the retainer ring 15 may be omitted from the transmission belt 10.

As described above, the continuously variable transmission disclosed herein is the continuously variable transmission (1) including the first pulley (3) on the driving side, the second pulley (5) on the driven side, and the transmission belt (10) looped around the V-shaped grooves of the first and second pulleys (3, 5) and including the plurality of elements (20A, 20A', 20A", 20B, 20B', 20B") each including the body portion (21) having the saddle surface (23s) and the pair of pillar portions (22) extending from the body portion (21) so as to be located on both sides of the saddle surface (23s) in the width direction, and the ring (12) arranged between the pair of pillar portions (22) of each of the plurality of elements (20A, 20A', 20A", 20B, 20B', 20B") such that the ring (12) is in contact with the saddle surface (23s). The continuously variable transmission (1) includes the lubricant supply portion (2a, 2b, 4a, 4b, 9) arranged on the inner side of the transmission belt (10) in the radial direction and configured to supply the lubricant to the transmission belt (10). Each of the plurality of elements (20A, 20A', 20A", 20B, 20B', 20B") further includes the pair of rocking edge portions (25) formed away from each other in the width direction, and the non-contact portion (27, 27', 27") that is the recess formed on the one surface of the body portion (21) so as to extend between the pair of rocking edge portions (25) in the width direction along the saddle surface (23s). The clearance (CL1, CL2) that communicates the non-contact portion (27, 27', 27") and the region on the inner side in the radial direction with respect to the transmission belt (10) is formed between the elements (20A, 20A', 20A", 20B, 20B', 20B") included in the looped portion of the transmission belt (10) around the first pulley (3) or the second pulley (5).

Each of the plurality of elements included in the transmission belt of the continuously variable transmission disclosed herein includes the pair of rocking edge portions formed away from each other in the width direction, and the non-contact portion that is the recess formed on the one surface of the body portion so as to extend between the pair of rocking edge portions in the width direction along the saddle surface. Therefore, the contact between the adjacent elements at a portion other than the rocking edge portion is suppressed. Thus, the durability of each element can further be improved. In the continuously variable transmission disclosed herein, the lubricant supply portion configured to supply the lubricant to the transmission belt is arranged on the inner side of the transmission belt in the radial direction, and the clearance that communicates the non-contact portion and the region on the inner side in the radial direction with respect to the transmission belt is formed between the elements included in the looped portion of the transmission belt around the first or second pulley. Therefore, the lubricant can be supplied from the lubricant supply portion to the non-contact portion of each element included in the looped portion. Thus, the lubricant can be supplied to the space between the saddle surface of the element and the ring by using the non-contact portion as a lubricant passage. As a result, it is possible to reduce the friction caused between the ring and the saddle surface of the element included in the looped portion of the transmission belt around the first or second pulley, and therefore further improve the durability and the power transfer efficiency of the transmission belt.

The first pulley (3) may include the fixed sheave (3a) integrated with the first shaft (2), and the movable sheave (3b) supported by the first shaft (2) so as to be slidable in the axial direction. The second pulley (5) may include the fixed sheave (5a) integrated with the second shaft (4), and the movable sheave (5b) supported by the second shaft (4) so as to be slidable in the axial direction. The lubricating oil supply portion may include the oil hole (2a, 2b) formed in the first shaft (2), and the oil hole (4a, 4b) formed in the second shaft (4). The depth of the non-contact portion (27, 27', 27") may be set so that the clearance (CL1, CL2) is secured when the groove width of one of the first and second pulleys (3, 5) is maximum.

The plurality of elements may include the first elements (20A, 20A', 20A") and the second elements (20B, 20B', 20B") each having a thickness larger than that of each of the first elements (20A, 20A', 20A"). The depth (D1, D2) of the non-contact portion (27, 27', 27") of each of the first elements (20A, 20A', 20A") may be set equal to the depth (D1, D2) of the non-contact portion (27, 27', 27") of each of the second elements (20B, 20B', 20B"). Thus, it is possible to suppress an increase in costs along with the formation of the non-contact portions in the first and second elements having different thicknesses.

In this case, a plurality of the first elements (20A, 20A', 20A") may be arrayed side by side and a plurality of the second elements (20B, 20B', 20B") may be arrayed side by side. The depths (D1, D2) of the non-contact portions of the first and second elements (20A, 20A', 20A", 20B, 20B', 20B") may be set so that the clearance (CL2) that communicates the non-contact portion (27, 27', 27") and the region on the inner side in the radial direction with respect to the transmission belt (10) is secured between the second elements (20B, 20B', 20B") included in the looped portion of the transmission belt (10) around the first or second pulley (3, 5) when the groove width of one of the first and second pulleys (3, 5) is maximum.

That is, if the looping radii of the transmission belt in the first or second pulley are equal to each other, the angle formed between the adjacent second elements included in the looped portion of the transmission belt around the first or second pulley is larger than the angle formed between the adjacent first elements included in the looped portion. As the looping radius of the transmission belt in the first or second pulley decreases, the angle formed between the adjacent second elements included in the looped portion of the transmission belt around the first or second pulley increases. As the angle increases, the contact line between the second elements moves toward the inner peripheral side, and the distance between the contact line and the bottom surface of the non-contact portion decreases. Therefore, if the depth of the non-contact portion is extremely small in the second element having a large thickness, there is a possibility that the clearance that communicates the non-contact portion and the region on the inner side in the radial direction with respect to the transmission belt is not secured depending on the looping radius of the transmission belt in the first or second pulley. In view of the above, in one mode disclosed herein, the depths of the non-contact portions of the first and second elements are set so that the clearance is secured between the second elements included in the looped portion when the groove width of one of the first and second pulleys is maximum and the looping radius of the transmission belt in the one of the first and second pulleys is minimum. Therefore, the clearance that communicates the non-contact portion and the region on the inner side in the radial direction with respect to the transmission belt can constantly be secured between the elements included in the looped portion of the transmission belt around the first or second pulley. Thus, the lubricant can constantly be supplied to the non-contact portion of each of the first and second elements included in the looped portion from the lubricant supply portion via the clearance.

The plurality of elements may include the first elements (20A, 20A', 20A") and the second elements (20B, 20B', 20B") each having a thickness larger than that of each of the first elements (20A, 20A', 20A"). The depth (D2) of the non-contact portion (27, 27', 27") of each of the second elements (20B, 20B', 20B") may be larger than the depth (D1) of the non-contact portion (27, 27', 27") of each of the first elements (20A, 20A', 20A"). Even if this structure is employed, the clearance that communicates the non-contact portion and the region on the inner side in the radial direction with respect to the transmission belt can constantly be secured between the elements included in the looped portion of the transmission belt around the first or second pulley.

In this case, the depth (D1) of the non-contact portion (27, 27', 27") of each of the first elements (20A, 20A', 20A") may be set so that the clearance (CL1) that communicates the non-contact portion (27, 27', 27") and the region on the inner side in the radial direction with respect to the transmission belt (10) is secured between the first elements (20A, 20A', 20A") included in the looped portion of the transmission belt (10) around the first or second pulley (3, 5) when the groove width of one of the first and second pulleys (3, 5) is maximum. The depth (D2) of the non-contact portion (27, 27', 27") of each of the second elements (20B, 20B', 20B") may be set so that the clearance (CL2) that communicates the non-contact portion (27, 27', 27") and the region on the inner side in the radial direction with respect to the transmission belt (10) is secured between the second elements (20B, 20B', 20B") included in the looped portion of the transmission belt (10) around the first or second pulley (3, 5) when the groove width of one of the first and second pulleys (3, 5) is maximum.

The plurality of elements may include the first elements (20A, 20A', 20A") and the second elements (20B, 20B', 20B") each having a thickness larger than that of each of the first elements (20A, 20A', 20A"). The clearance (CL2) between the second elements (20B, 20B', 20B") included in the looped portion of the transmission belt (10) around the first or second pulley (3, 5) may be smaller than the clearance (CL1) between the first elements (20A, 20A', 20A") included in the looped portion.

Each of the plurality of elements (20A, 20A', 20A", 20B, 20B', 20B") may further include the tapered surface (21s) formed on the one surface of the body portion (21) so as to extend from the pair of rocking edge portions (25) and the non-contact portion (27, 27', 27") in the direction opposite to the protruding direction of each of the pillar portions (22).

The non-contact portion (27, 27', 27") may be open at the saddle surface (23s) and extend to the edge of each of the elements (20A, 20A', 20A", 20B, 20B', 20B") on the inner peripheral side. By employing this structure, the clearance that communicates the non-contact portion and the region on the inner side in the radial direction with respect to the transmission belt can be formed more easily between the elements included in the looped portion of the transmission belt around the first or second pulley.

The first pulley (3) may include the fixed sheave (3a) integrated with the first shaft (2), and the movable sheave (3b) supported by the first shaft (2) so as to be slidable in the axial direction. The second pulley (5) may include the fixed sheave (5a) integrated with the second shaft (4), and the movable sheave (5b) supported by the second shaft (4) so as to be slidable in the axial direction. The lubricating oil supply portion may include the oil hole (2a, 2b) formed in the first shaft (2), and the oil hole (4a, 4b) formed in the second shaft (4). Thus, the lubricant can satisfactorily be supplied to the non-contact portion of the element included in the looped portion via the clearance.

The lubricating oil supply portion may include at least one nozzle (9) arranged between the first pulley (3) and the second pulley (5).

Each of the plurality of elements (20A, 20A', 20A", 20B, 20B', 20B") may further include the pair of hook portions (22f) that face each other and protrude in the width direction of the saddle surface (23s) from the free ends of the pillar portions (22). The transmission belt (10) may further include the retainer ring (15) arranged between the ring (12) and the hook portions (22f) of each of the plurality of elements (20A, 20A', 20A", 20B, 20B', 20B").

The transmission belt disclosed herein is the transmission belt (10) to be looped around the V-shaped grooves of the first and second pulleys (3, 5) and including the plurality of elements (20A, 20A', 20A", 20B, 20B', 20B") each including the body portion (21) having the saddle surface (23s) and the pair of pillar portions (22) extending from the body portion (21) so as to be located on both sides of the saddle surface (23s) in the width direction, and the ring (12) arranged between the pair of pillar portions (22) of each of the plurality of elements (20A, 20A', 20A", 20B, 20B', 20B") such that the ring (12) is in contact with the saddle surface (23s). Each of the plurality of elements (20A, 20A', 20A", 20B, 20B', 20B") further includes the pair of rocking edge portions (25) formed away from each other in the width direction, and the non-contact portion (27, 27', 27") that is the recess formed on the one surface of the body portion (21) so as to extend between the pair of rocking edge portions (25) in the width direction along the saddle surface (23s). The clearance (CL1, CL2) that communicates the non-contact portion (27, 27', 27") and the region on the inner side in the radial direction with respect to the transmission belt (10) is formed between the elements (20A, 20A', 20A", 20B, 20B', 20B") included in the looped portion of the transmission belt (10) around the first pulley (3) or the second pulley (5).

In the transmission belt, it is possible to reduce the friction caused between the ring and the saddle surface of the element included in the looped portion of the transmission belt around the first or second pulley, and therefore further improve the durability and the power transfer efficiency.

It is understood that the various aspects of the invention disclosed herein is not limited to the embodiment described above and various modifications may be made within the extensive scope of the disclosure. The embodiment described above is merely one specific mode of the invention described in the "SUMMARY OF THE DISCLOSURE" section, and is not intended to limit the elements of the invention described in the "SUMMARY OF THE DISCLOSURE" section.

INDUSTRIAL APPLICABILITY

The various aspects of the present disclosure are applicable to, for example, industry for manufacturing a continuously variable transmission and a transmission belt.

The invention claimed is:

1. A continuously variable transmission including a first pulley on a driving side, a second pulley on a driven side, and a transmission belt looped around V-shaped grooves of the first and second pulleys and including a plurality of elements each including a body portion having a saddle surface and a pair of pillar portions extending from the body portion so as to be located on both sides of the saddle surface in a width direction, and a ring arranged between the pair of pillar portions of each of the plurality of elements such that the ring is in contact with the saddle surface,
the continuously variable transmission comprising a lubricant supply portion arranged on an inner side of the transmission belt in a radial direction and configured to supply a lubricant to the transmission belt, wherein
each of the plurality of elements further includes a pair of rocking edge portions formed away from each other in the width direction, and a non-contact portion that is a recess formed on one surface of the body portion so as to extend between the pair of rocking edge portions in the width direction along the saddle surface, and
a clearance extends across a center of the ring in a width direction and that communicates the non-contact portion and a region on an inner side in the radial direction with respect to the transmission belt is formed between the elements included in a looped portion of the transmission belt around the first pulley or the second pulley.

2. The continuously variable transmission according to claim 1, wherein
the first pulley includes a fixed sheave integrated with a first shaft, and a movable sheave supported by the first shaft so as to be slidable in an axial direction,
the second pulley includes a fixed sheave integrated with a second shaft, and a movable sheave supported by the second shaft so as to be slidable in the axial direction,
the lubricating oil supply portion includes an oil hole formed in the first shaft, and an oil hole formed in the second shaft, and
a depth of the non-contact portion is set so that the clearance is secured when a groove width of one of the first and second pulleys is maximum.

3. The continuously variable transmission according to claim 1, wherein
the plurality of elements include first elements and second elements each having a thickness larger than a thickness of each of the first elements, and
a depth of the non-contact portion of each of the first elements is set equal to a depth of the non-contact portion of each of the second elements.

4. The continuously variable transmission according to claim 3, wherein
a plurality of the first elements are arrayed side by side and a plurality of the second elements are arrayed side by side, and
the depths of the non-contact portions of the first and second elements are set so that a clearance that communicates the non-contact portion and the region on the inner side in the radial direction with respect to the transmission belt is secured between the second elements included in the looped portion of the transmission belt around the first or second pulley when a groove width of one of the first and second pulleys is maximum.

5. The continuously variable transmission according to claim 1, wherein
the plurality of elements include first elements and second elements each having a thickness larger than a thickness of each of the first elements, and
a depth of the non-contact portion of each of the second elements is larger than a depth of the non-contact portion of each of the first elements.

6. The continuously variable transmission according to claim 5, wherein
the depth of the non-contact portion of each of the first elements is set so that a clearance that communicates the non-contact portion and the region on the inner side in the radial direction with respect to the transmission belt is secured between the first elements included in the looped portion of the transmission belt around the first or second pulley when a groove width of one of the first and second pulleys is maximum, and
the depth of the non-contact portion of each of the second elements is set so that a clearance that communicates the non-contact portion and the region on the inner side in the radial direction with respect to the transmission belt is secured between the second elements included in the looped portion of the transmission belt around the first or second pulley when the groove width of one of the first and second pulleys is maximum.

7. The continuously variable transmission according to claim 1, wherein
the plurality of elements include first elements and second elements each having a thickness larger than a thickness of each of the first elements, and
a clearance between the second elements included in the looped portion of the transmission belt around the first or second pulley is smaller than a clearance between the first elements included in the looped portion.

8. The continuously variable transmission according to claim 1, wherein each of the plurality of elements further includes a tapered surface formed on the one surface of the body portion so as to extend from the pair of rocking edge portions and the non-contact portion in a direction opposite to a protruding direction of each of the pillar portions.

9. The continuously variable transmission according to claim 1, wherein the non-contact portion is open at the saddle surface and extends to an edge of each of the elements on an inner peripheral side.

10. The continuously variable transmission according to claim 1, wherein the lubricating oil supply portion includes at least one nozzle arranged between the first pulley and the second pulley.

11. The continuously variable transmission according to claim 1, wherein
each of the plurality of elements further includes a pair of hook portions that face each other and protrude in the width direction of the saddle surface from free ends of the pillar portions, and
the transmission belt further includes a retainer ring arranged between the ring and the hook portions of each of the plurality of elements.

12. A transmission belt to be looped around V-shaped grooves of first and second pulleys of a continuously variable transmission, the transmission belt comprising a plurality of elements each including a body portion having a saddle surface and a pair of pillar portions extending from the body portion so as to be located on both sides of the saddle surface in a width direction, and a ring arranged between the pair of pillar portions of each of the plurality of elements such that the ring is in contact with the saddle surface, wherein each of the plurality of elements further includes a pair of rocking edge portions formed away from each other in the width direction, and a non-contact portion that is a recess formed on one surface of the body portion so as to extend between the pair of rocking edge portions in the width direction along the saddle surface, and a clearance extends across a center of the ring in a width direction and that communicates the non-contact portion and a region on an inner side in a radial direction with respect to the transmission belt is formed between the elements included in a looped portion of the transmission belt around the first pulley or the second pulley.

13. A continuously variable transmission including a first pulley on a driving side, a second pulley on a driven side, and a transmission belt looped around V-shaped grooves of the first and second pulleys and including a plurality of elements each including a body portion having a saddle surface and a pair of pillar portions extending from the body portion so as to be located on both sides of the saddle surface in a width direction, and a ring arranged between the pair of pillar portions of each of the plurality of elements such that the ring is in contact with the saddle surface, the continuously variable transmission comprising a lubricant supply portion arranged on an inner side of the transmission belt in a radial direction and configured to supply a lubricant to the transmission belt, wherein each of the plurality of elements further includes a pair of rocking edge portions formed away from each other in the width direction, and a non-contact portion that is a recess formed on one surface of the body portion so as to extend between the pair of rocking edge portions in the width direction along the saddle surface, and a clearance that communicates the non-contact portion and a region on an inner side in the radial direction with respect to the transmission belt is formed between the elements included in a looped portion of the transmission belt around the first pulley or the second pulley, wherein a depth of the non-contact portion is set so that the clearance is secured when a groove width of one of the first and second pulleys is a maximum.

\* \* \* \* \*